No. 659,808. Patented Oct. 16, 1900.
E. VON BÜHLER.
STERILIZING OR PASTEURIZING APPARATUS.
(Application filed Dec. 29, 1899.)
(No Model.)
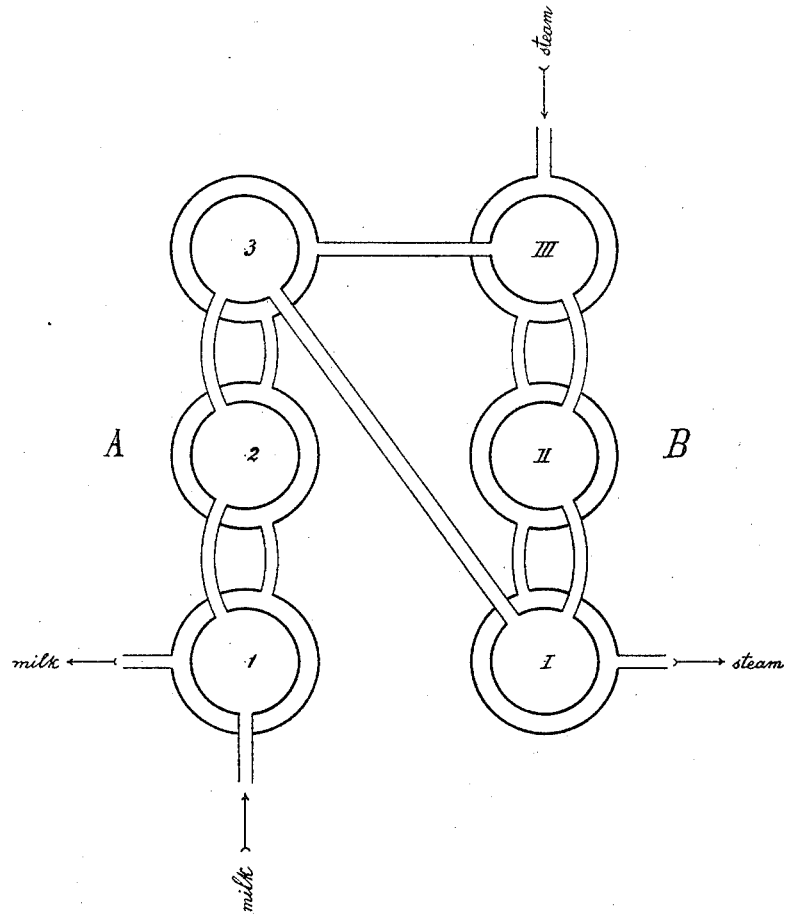

UNITED STATES PATENT OFFICE.

EMIL VON BÜHLER, OF CHARLOTTENBURG, GERMANY.

STERILIZING OR PASTEURIZING APPARATUS.

SPECIFICATION forming part of Letters Patent No. 659,808, dated October 16, 1900.

Application filed December 29, 1899. Serial No. 741,990. (No model.)

*To all whom it may concern:*

Be it known that I, EMIL VON BÜHLER, a subject of the German Emperor, residing in Charlottenburg, near Berlin, in the Kingdom of Prussia, Germany, have invented certain new and useful Improvements in a Device for Pasteurizing or Sterilizing Liquids of Every Kind, especially Milk; and I do hereby declare the following to be a full, clear, and exact description of the invention, such as will enable others skilled in the art to which it appertains to make and use the same.

The process of heating milk by means of a single apparatus for the purpose of pasteurizing and sterilizing has the following defects: The steam, which is almost exclusively used as a heating medium, introduced into the heating-space under pressure gives the heating-walls an almost uniform temperature, so that the cold milk, entering the apparatus, is suddenly brought into contact with the highly-heated walls, and experience has shown that, in spite of the stirring device, this will cause the milk either to adhere to the walls, or even to burn. Another disadvantage is that the pressure with which the milk is forced into the apparatus produces a current, which by the action of the stirring device will cause certain parts of the milk to pass the apparatus so quickly as to prevent it from being sufficiently pasteurized or sterilized. By employing regenerators, by means of which the inducted milk is previously heated by the heated milk that flows off, the disadvantage that the milk adheres to the heating-walls or that it gets burned is somewhat diminished; but no means are provided for removing the danger of an imperfect pasteurization or sterilization. By the present invention these two drawbacks are entirely obviated.

The invention consists of two batteries joined to each other, each battery formed of two or several apparatus connected with one another, one of the batteries serving to complete the heating of the previously-heated milk by an independent heating medium and the other to previously heat the cold milk by means of the milk heated in the first battery. Each apparatus consists of a "regenerator," in this instance an inner and an outer receptacle containing, respectively, fluids of different temperatures and passing in opposite directions, so that heat from the hotter fluid will be transmitted through the wall of the inner receptacle to the cooler fluid. This principle of operation is called the "counter-current" principle.

In the accompanying drawing are shown as an example two batteries, each consisting of three apparatus connected with each other. In the battery A, consisting of the regenerators 1 2 3, the cold milk is previously heated by means of the milk already heated, while in the battery B, consisting of the regenerators I II III, the milk which is previously heated in the battery A is heated by means of any independent heating medium. The inner circles represent the heated space and the outer ring-shaped spaces the heating-space of the single apparatus. Both the preliminary heating and the heating proper are effected according to the counter-current principle.

By distributing the milk and the two heating mediums—steam, for instance, and heated milk—into a number of apparatus the milk gets gradually heated and the two heating mediums are gradually cooled off, so that great differences in the temperature between the milk and the heating-walls touched by the milk cannot take place and that the milk cannot adhere to the walls or get burned. The danger of an insufficient pasteurization or sterilization of certain parts of the milk is obviated, since though it may happen that single parts of the milk are discharged from one apparatus into the other with too great a speed it is improbable that this will also be the case in the second or third apparatus.

It may still be stated that a further advantage of my invention consists in the easy manufacture and the convenient mounting of the required apparatus. Instead of building apparatus of different sizes only small standard types are made, of which so many are connected with each other that their total output corresponds with the required output. The packing, transport, and mounting of the small apparatus require less trouble than large ones, besides the small apparatus being more handy for cleaning, which is of great advantage, especially in dairies.

Having fully described my invention and set forth its merits, what I claim, and desire to secure by Letters Patent, is—

A device for pasteurizing or sterilizing liquids consisting of two batteries joined to each other, each battery formed of a plurality of double receptacles connected one to another, the whole so arranged that the liquid may be gradually heated on the counter-current principle, one of the batteries serving to complete the heating of the liquid by an independent heating medium and the other battery serving to preliminarily heat the liquid by means of the liquid heated in the first-named battery.

In testimony whereof I have hereunto signed my name in the presence of two subscribing witnesses.

EMIL VON BÜHLER.

Witnesses:
FRANZ PISSUR,
L. RORVARSCH.